United States Patent [19]

Yorimoto et al.

[11] Patent Number: 5,410,714
[45] Date of Patent: Apr. 25, 1995

[54] INTEGRATED-CIRCUIT CARD EQUIPPED WITH A SINGLE CHIP DATA PROCESSOR AUTOMATICALLY ENTERING LOW-POWER CONSUMPTION MODE

[75] Inventors: Yoshikazu Yorimoto; Masashi Takahashi; Seiji Hirano, all of Tokyo, Japan

[73] Assignee: Toppan Printing Co. Ltd., Tokyo, Japan

[21] Appl. No.: 872,528

[22] Filed: Apr. 23, 1992

Related U.S. Application Data

[63] Continuation of Ser. No. 347,212, May 4, 1989, Pat. No. 5,129,091.

[30] Foreign Application Priority Data

May 6, 1988 [JP] Japan .................................. 63-110865
May 6, 1988 [JP] Japan .................................. 63-110866
Jun. 21, 1988 [JP] Japan .................................. 63-153785

[51] Int. Cl.6 ............................................. G06F 1/32
[52] U.S. Cl. ................................ 395/750; 235/492; 235/380; 364/273.1; 364/DIG. 1; 364/707
[58] Field of Search ............... 395/750, 575; 364/707, 364/273.1, DIG. 1, 948.8, DIG. 2, 483; 371/66; 235/492, 380

[56] References Cited

U.S. PATENT DOCUMENTS

| | | | |
|---|---|---|---|
| 4,317,180 | 2/1982 | Lies | 364/707 |
| 4,317,181 | 2/1982 | Teza et al. | 395/750 |
| 4,361,873 | 11/1982 | Harper et al. | 395/750 |
| 4,365,290 | 12/1982 | Nelms et al. | 364/707 |
| 4,409,665 | 10/1983 | Tubbs | 395/750 |
| 4,698,748 | 10/1987 | Juzswik et al. | 395/750 |
| 4,748,320 | 5/1988 | Yorimoto et al. | 235/492 |
| 4,758,945 | 7/1988 | Remedi | 395/750 |
| 4,814,591 | 3/1989 | Nara et al. | 235/380 |
| 4,825,407 | 4/1989 | Loessel et al. | 395/550 |
| 4,827,111 | 5/1989 | Kondo | 235/380 |
| 4,839,530 | 6/1989 | Greenwood | 307/10.1 |
| 4,851,987 | 7/1989 | Day | 395/550 |
| 4,880,097 | 11/1989 | Speas | 194/239 |
| 4,922,450 | 5/1990 | Rose et al. | 395/750 |
| 4,924,075 | 5/1990 | Tanaka | 235/380 |
| 5,025,387 | 6/1991 | Frane | 395/750 |
| 5,072,103 | 12/1991 | Nara | 235/492 |
| 5,083,266 | 1/1992 | Watanabe | 395/275 |
| 5,105,074 | 4/1992 | Nara | 235/492 |
| 5,113,184 | 5/1992 | Katayama | 340/825.54 |
| 5,168,151 | 12/1992 | Nara | 235/492 |
| 5,202,838 | 4/1993 | Inoue | 364/480 |
| 5,212,373 | 5/1993 | Fujioka et al. | 235/492 |
| 5,247,164 | 9/1993 | Takahashi | 235/492 |

OTHER PUBLICATIONS

"Hitachi Microcomputer Data Book 8-Bit Single-Chip", pp. 358/390, Feb. 1985.

Primary Examiner—Jack B. Harvey
Assistant Examiner—Glenn A. Auve
Attorney, Agent, or Firm—Burns, Doane, Swecker & Mathis

[57] ABSTRACT

A semiconductor integrated-circuit card including a microprocessor having an active mode of operation capable of processing data and a low power consumption mode of operation disabled from processing data, the microprocessor being operative to (1) establish the low power consumption mode of operation in the IC card when the microprocessor is initially activated to start operation, (2) make a shift from the low power consumption mode of operation to the active mode of operation responsive to an interrupt signal from an external signal source, and (3) make a shift from the active mode of operation back to the low power consumption mode of operation upon termination of the data processing in the active mode of operation.

7 Claims, 13 Drawing Sheets

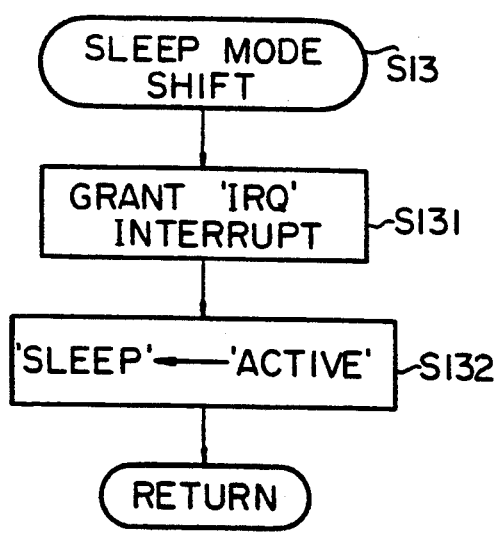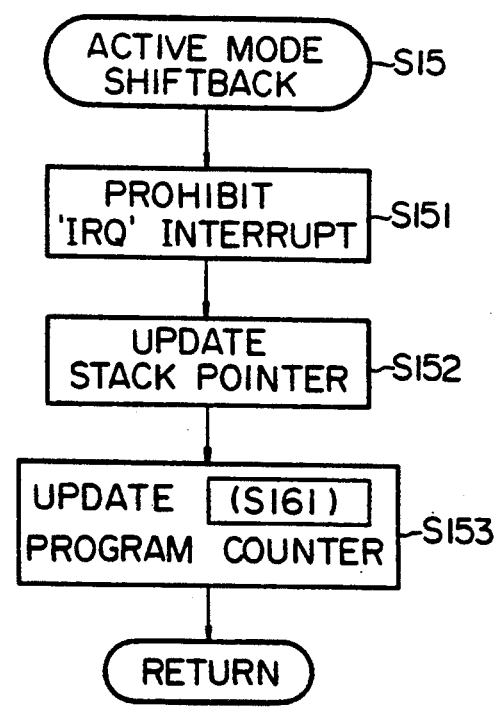

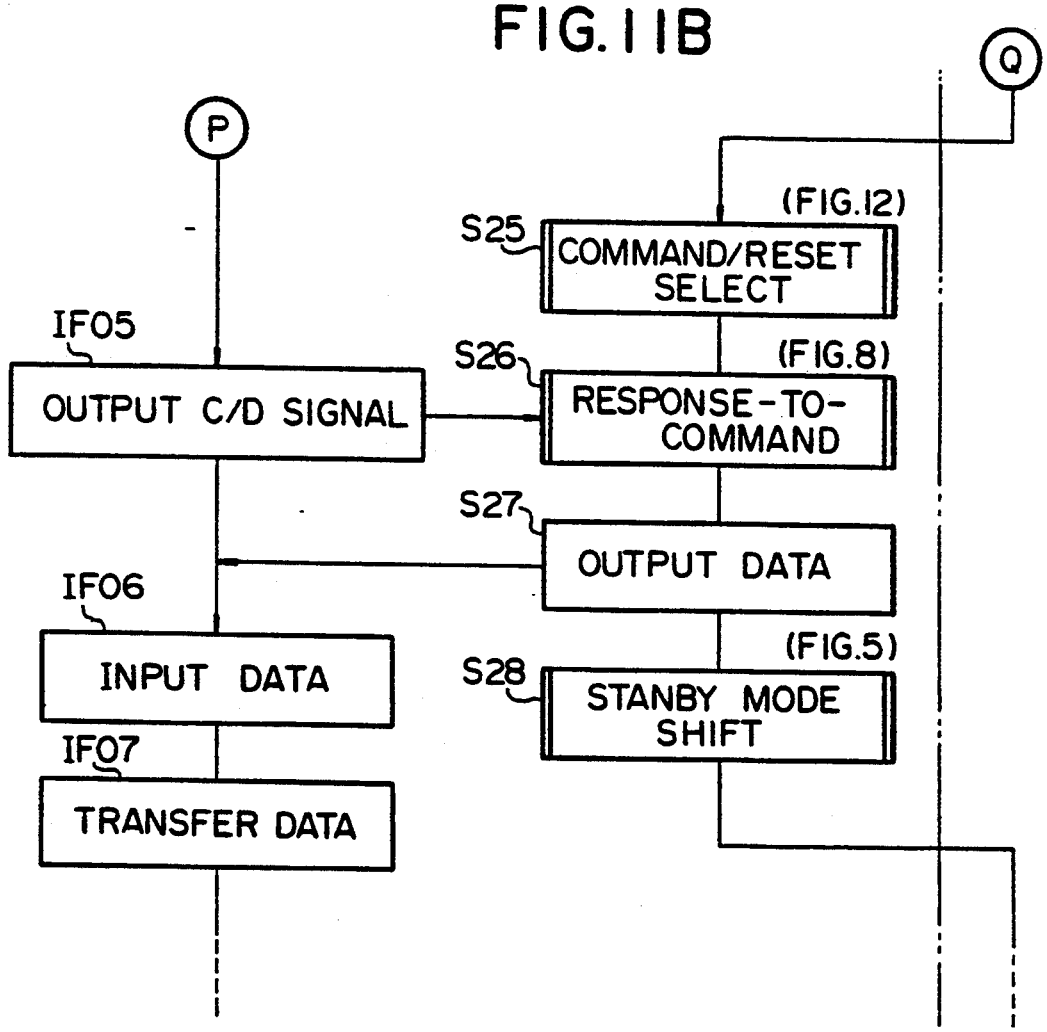

INTEGRATED-CIRCUIT CARD EQUIPPED WITH A SINGLE CHIP DATA PROCESSOR AUTOMATICALLY ENTERING LOW-POWER CONSUMPTION MODE

This application is a continuation of application Ser. No. 07/347,212, filed May 4, 1989, now U.S. Pat. No. 5,129,091.

FIELD OF THE INVENTION

The present invention relates to an integrated-circuit card used to exchange information with an external data processing system.

BACKGROUND OF THE INVENTION

A semiconductor integrated-circuit card (hereinafter referred to simply as IC card) is a data carrier device in the form of a card having a microprocessor unit and an on-chip or off-chip integrated-circuit data storage memory provided on a printed circuit board on a sheet substrate.

With a view to expanding the range of applications of IC cards, there is a demand for a portable IC card data processing system. Attempts are thus made to realize a miniaturized IC card data processing system having a built-in power supply implemented by a battery. One of the most important requirements of an IC card card data processing system of this type is to minimize the consumption of the power supplied from the system to the IC card so as to extend the service life of the battery incorporated in the system. A prolonged service life would be achievable by a battery of an increased capacity. This kind of approach to increasing the service life of a built-in power supply source is however not unconditionally acceptable because of the exacting space and weight requirements of a miniaturized IC card data processing system. The power consumption of an IC card could be significantly reduced if the microprocessor unit and data storage memory incorporated in an IC card are formed by CMOS (complementary metal-oxide-semiconductor) devices featuring low power dissipation. Tremendous amounts of time and cost will however be required for the development of a new integrated circuit of such CMOS configuration.

SUMMARY OF THE INVENTION

It is, accordingly, an important object of the present invention to provide an improved IC card which features low power consumption and which can be realized without drastic modification made to the existing device configuration of the microprocessor unit and data storage memory incorporated in the card.

It is another important object of the present invention to provide an improved IC card which is advantageous when used with an IC card data processing system of the type having a built-in power supply source.

It is still another important object of the present invention to provide an improved IC card which is particularly useful with a miniaturized IC card data processing system of the portable type.

In accordance with the present invention, there is provided a semiconductor IC card including a data processing means having an active mode of operation capable of processing data and a low power consumption mode of operation disabled from processing data, the data processing means comprising a) first mode shift means responsive to activation of the data processing means for establishing the low power consumption mode of operation in the IC card when the data processing means is initially activated to start operation, b) second mode shift means responsive to an interrupt signal from an external signal source for making a shift from the low power consumption mode of operation to the active mode of operation and enabling the data processing means to process data, and c) third mode shift means for making a shift from the active mode of operation back to the low power consumption mode of operation upon termination of the data processing in the active mode of operation.

In accordance with another outstanding aspect of the present invention, there is provided a semiconductor integrated-circuit card including a data processing means having an active mode of operation capable of processing data and a low power consumption mode of operation disabled from processing data and memory means having a data read cycle and a data write cycle, the data processing means comprising a) data write control means for generating a write enable signal to enable the memory means to operate in a data write cycle during the active mode of operation of the IC card, b) first mode shift means responsive to the write enable signal for making a shift from the active mode of operation to the low power consumption mode of operation after the write enable signal is transmitted to the memory means, and c) second mode shift means for making a shift from the low power consumption mode of operation back to the active mode of operation upon termination of the data write cycle in the memory means. In an integrated-circuit card according to this second outstanding aspect of the present invention, the first mode shift means may be arranged to be responsive to an interrupt signal from an external signal source for making a shift from the low power consumption mode of operation to the active mode of operation and enabling the data processing means to process data. In this instance, the data processing means further comprises d) control means for making the second mode shift means irresponsive to the interrupt signal during a data write cycle of the memory means. In this type of integrated-circuit card according to the second outstanding aspect of the present invention, the control means may comprise an interrupt signal input port through which to receive the interrupt signal from the external signal source, means for de-activating the interrupt signal input port during a data write cycle of the memory means, and means for activating the interrupt signal input terminal on termination of a data write cycle of the memory means.

In accordance with still another outstanding aspect of the present invention, there is provided a semiconductor integrated-circuit card including a data processing means having an active mode of operation capable of processing data and a low power consumption mode of operation disabled from processing data and memory means having a data read cycle and a data write cycle, the data processing means comprising a) first mode shift means responsive to activation of the data processing means for establishing the low power consumption mode of operation in the IC card when the data processing means is initially activated to start operation, b) second mode shift means responsive to an interrupt signal from an external signal source for making a shift from the low power consumption mode of operation to the active mode of operation and enabling the data processing means to process data, c) third mode shift means for making a shift from the active mode of operation back to the low power consumption mode of operation upon termination of the data processing in the active mode of operation, and d) control means for making the third mode shift means irresponsive to the interrupt signal during a data write cycle of the memory means. In this integrated-circuit card according to the third outstanding aspect of the present invention, the control means may comprise an interrupt signal input port through which to receive the interrupt signal from the external signal source, means for deactivating the interrupt signal input port during a data write cycle of the memory means, and means for activating the interrupt signal input terminal on termination of a data write cycle of the memory means.

In accordance with still another outstanding aspect of the present invention, there is provided a semiconductor integrated-circuit card including a data processing means having an active mode of operation capable of processing data and a low power consumption mode of operation disabled from processing data, the data processing means comprising a) first mode shift means responsive to a first control signal for making a shift from the active mode of operation to the low power consumption mode of operation, and b) second mode shift means responsive to a second control signal for making a shift from the low power consumption mode of operation to the active mode of operation. In this instance, the data processing means may further comprise means for generating each of the first and second control signals each in response to a signal generated in and supplied from an external source or each of the first and second control signals may be generated in and supplied from an external source.

BRIEF DESCRIPTION OF THE DRAWINGS

The drawbacks of a prior-art IC card and the features and advantages of an IC card according to the present invention will be more clearly understood from the following description taken in conjunction with the accompanying drawings in which:

FIG. 5 is a flowchart showing the details of the sleeping mode shift subroutine program included in the main routine program illustrated in FIG. 4;

FIG. 6 is a flowchart showing the details of active mode shift subroutine program also included in the main routine program illustrated in FIG. 4;

FIGS. 11A and 11B are flowcharts showing the main routine program predominant over the operation of the microprocessor unit incorporated in a first preferred embodiment of an IC card according to the present invention;

DESCRIPTION OF THE PRIOR ART

Description will now be made in regard to the basic mode of operation which an ordinary IC card performs with an IC card data processing system (hereinafter referred to as data transmitter/receiver system). The data transmitter/receiver system with which an IC card according to the present invention is to be used is typically implemented by a handheld computer which is also called handy terminal.

Figure 1:
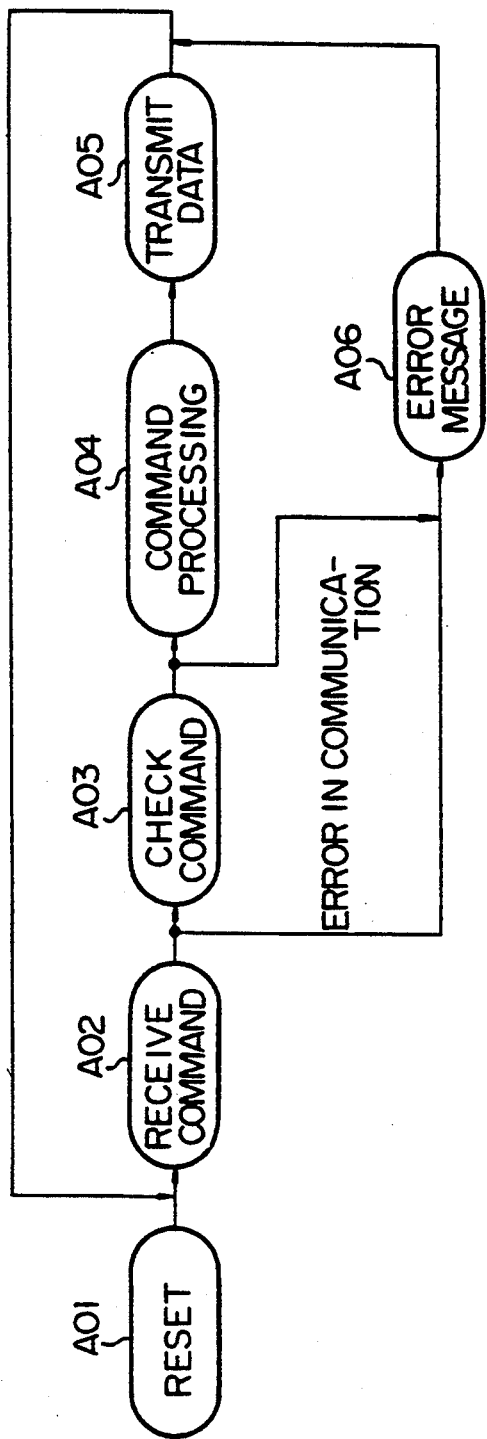
FIG. 1 is a diagram showing the basic mode of operation of an ordinary IC card of the type to which the present invention generally appertains.

When an IC card is loaded into a data transmitter/receiver system, the microprocessor unit incorporated in the IC card is reset and thereafter the IC card receives an initial command from the data transmitter/receiver system as indicated by steps A01 and A02 in FIG. 1. On receipt of the command from the data transmitter/receiver system, the microprocessor unit provided in the IC card checks the command for any error as at step A03 and, when it is determined that the command received is free from error, the microprocessor unit executes at step A04 a series of command processing jobs responsive to the command and at step A05 transmits to the data transmitter/receiver system the data resulting from the command processing. If it is detected that any error has occurred during transmission of the command from the data transmitter/receiver system to the IC card or it is found at step A03 that any error is present in the command received by the IC card, the microprocessor unit in the IC card sends an error message to the data transmitter/receiver system as at step A06. Responsive to the data transferred from the IC card at step A05 or to the error message sent from the IC card at step A06, the data transmitter/receiver system may supply another command or send the initial command for a second time to the IC card.

Figure 2:
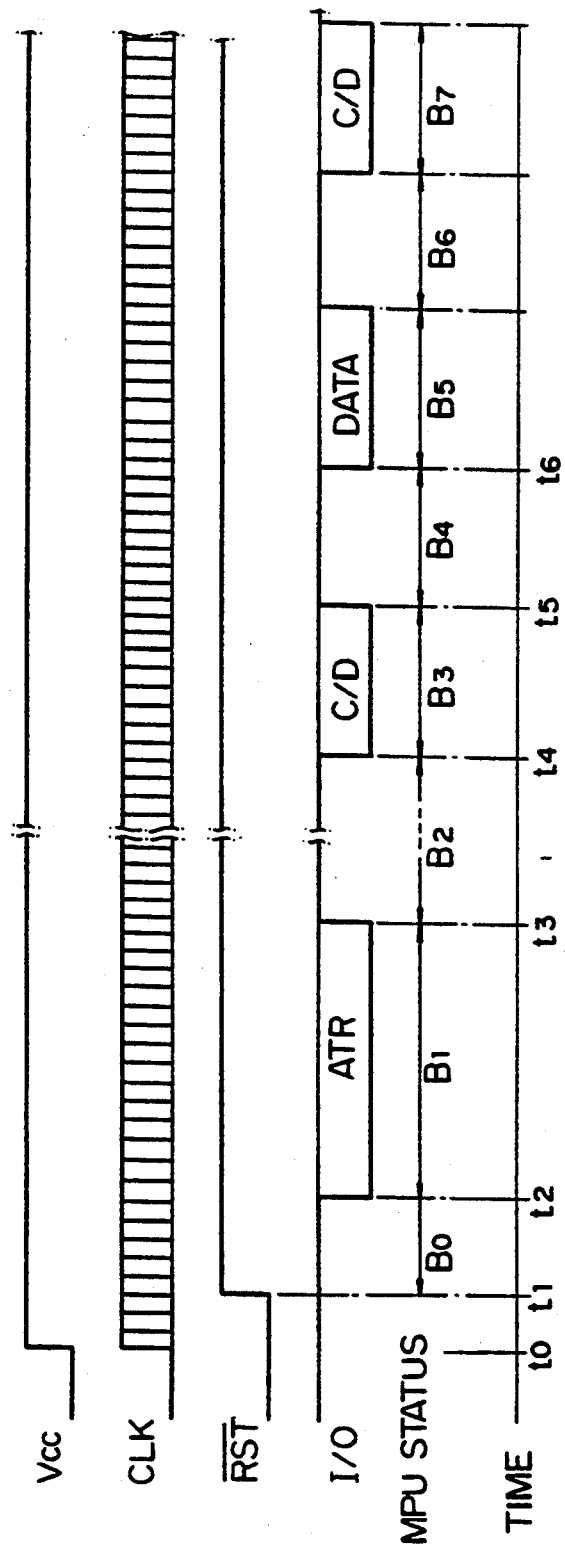
FIG. 2 is a timechart showing waveforms and events which may appear when the IC card is loaded into a data transmitter/receiver system.

FIG. 2 is a timechart showing waveforms and events which may appear after the IC card is initially loaded into the data transmitter/receiver system. With the IC card thus coupled to the data transmitter/receiver system, a predetermined supply voltage $V_{cc}$ and a train of clock pulses CLK are supplied to the IC card through the power supply and clock input terminals, respectively, of the card as at time $t_0$. Subsequently at time $t_1$, the IC card receives from the data transmitter/receiver system a reset signal $\overline{RST}$ which enables the microprocessor unit in the IC card to execute a hardware subroutine program $B_0$ to reset and initialize the various active devices incorporated in the microprocessor unit. Upon termination of the execution of the hardware reset subroutine program $B_0$, the microprocessor unit in the IC card starts to execute a subroutine program $B_1$ as at time $t_2$ to send answer-to-reset information "ATR" from its data output port to inform the data transmitter/receiver system that the IC card is ready to receive command and data from the data transmitter/receiver system.

After the transmission of the answer-to-reset information "ATR" to the data transmitter/receiver system is complete as at time $t_3$, the microprocessor unit in the IC card holds a wait state $B_2$ to await receiving of a serial command/data signal C/D which is to be subsequently output from the data transmitter/receiver system. On receipt of the command/data signal C/D as at time $t_4$, the microprocessor unit in the IC card starts to execute a command processing routine program $B_3$ to check the command for any error and, in the absence detected of an error in the command received, perform a series of jobs required by the command. Upon lapse of a certain period of time $B_4$ after the execution of the command processing subroutine program $B_3$ is complete as at time $t_5$, the microprocessor unit in the IC card starts execution of a data transmission subroutine program $B_5$ as at time $t_6$ to transmit to the data transmitter/receiver system the data resulting from the command processing. The IC card which has thus transferred data to the data transmitter/receiver system then holds a wait state until another command/data signal is output from the data transmitter/receiver system.

DESCRIPTION OF THE PREFERRED EMBODIMENTS

Figure 3:
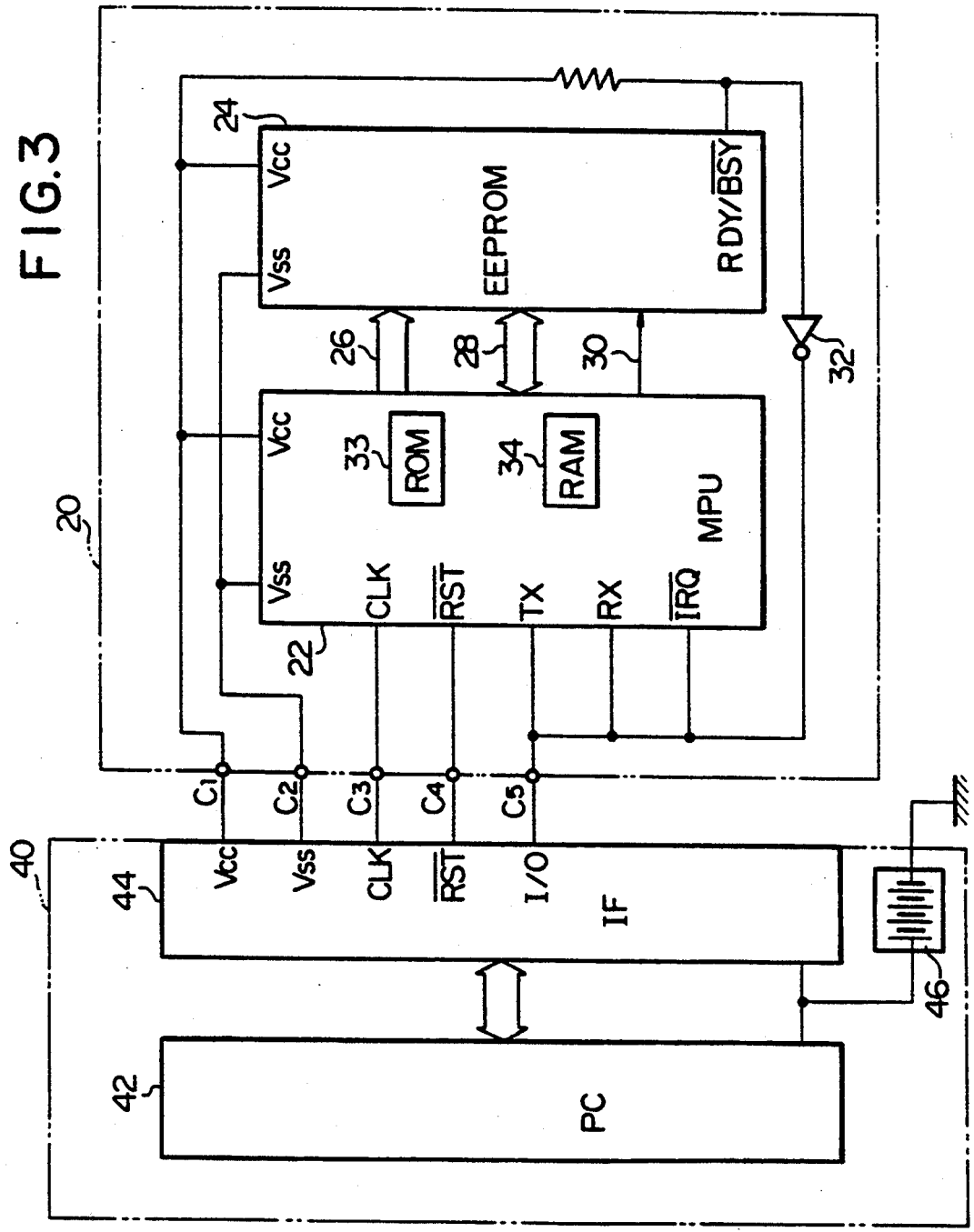
FIG. 3 is a block diagram schematically showing the general arrangement in which the microprocessor unit and the data storage memory forming part of an IC card to which the present invention generally appertains are coupled with an IC card data processing or data transmitter/receiver system.

Referring to FIG. 3, an IC card 20 to which the present invention appertains comprises a semiconductor microprocessor unit 22 (MPU) and a data storage memory 24. The data storage memory 24 is implemented by any non-volatile semiconductor integrated-circuit memory such as typically an electrically erasable/programmable read-only memory (EEPROM). The memory 24 is herein shown as being of the off-chip type but, if desired, may be of the on-chip type fabricated on the semiconductor chip on which the microprocessor unit is formed. The microprocessor unit 22 and data storage memory 24 are coupled together through an address bus 26, a data bus 28 and a control line 30.

The IC card 20 has contacts which are shown comprising a supply voltage input contact $C_1$ through which to receive a predetermined supply voltage $V_{cc}$, and a ground contact $C_2$ for connection to ground potential $V_{ss}$. Each of these supply voltage input contact $C_1$ and ground contact $C_2$ is connected to each of the microprocessor unit 22 and data storage memory 24. The contacts provided on the IC card 20 further comprises a clock input contact $C_3$ through which to receive clock pulses CLK, a reset contact $C_4$ through which to receive a reset signal $\overline{RST}$ to reset and initialize the microprocessor unit 22, a data input/output contact $C_5$ through which to receive or transmit data or to receive an interrupt request signal "$\overline{IRQ}$" from the data transmitter/receiver system 40. The data input/output contact $C_5$ is thus connected to a data output port TX, a data input port RX, and an interrupt request signal input port $\overline{IRQ}$ of the microprocessor unit 22 as shown. The interrupt request signal input port $\overline{IRQ}$ of the microprocessor unit 22 is activated or de-activated by means of the microprocessor unit 22 of the IC card 20 and, when activated, allows generation of an interrupt to the microprocessor unit 22 in response to an active-low interrupt request signal "$\overline{IRQ}$" of low level "L" from the data transmitter/receiver system 40.

Furthermore, the interrupt request signal input port $\overline{IRQ}$ of the microprocessor unit 22 is connected through an inverter 32 to an interrupt disable signal output port RDY/$\overline{BSY}$ of the data storage memory 24 so that a request for interrupt to the microprocessor unit 22 is not accepted when data is being loaded into the memory 24 during data write cycle of the microprocessor unit 22, as will be described in more detail. During write cycle of the data storage memory 24, an active-low interrupt request signal output port RDY/$\overline{BSY}$ of low level "L" is output from the memory 24 and is inverted by the inverter 32. A potential of high level "H" is thus applied to the interrupt request signal input port $\overline{IRQ}$ of the microprocessor unit 22 and so that the microprocessor unit 22 is prohibited from granting an interrupt through the port $\overline{IRQ}$.

The microprocessor unit 22 has incorporated therein a read-only memory 33 (ROM) storing a program predominant over the operation of the microprocessor unit 22 and a random-access memory 34 (RAM) for temporarily storing the data input to or to be output from the microprocessor unit 22 and the data generated in the microprocessor unit 22. The microprocessor unit 22 used in the IC card to which the present invention appertains is, by way of example, assumed to be implemented by a product of the HD6301 series commercially available from Hitachi, Limited or an equivalent thereof.

The IC card 20 is adapted for use with a data transmitter/receiver system 40 which is herein assumed to be of the portable type. The data transmitter/receiver system 40 largely comprises a computer module such as a personal computer 42 (PC) and an interface (IF) device 44 having terminals which are to be connected to the contacts $C_1$ to $C_5$, respectively, of the IC card 20 when the IC card 20 is coupled to the data transmitter/receiver system 40 as shown. In this data transmitter/receiver system 40 is exchangeably incorporated a built-in d.c. power supply source 46 which is typically implemented by a battery. The interface device 44 of the data transmitter/receiver system 40 herein shown may be one of a plurality of terminal units controlled by a central host computer system and, thus, the personal computer 42 may be implemented by such a central host computer system. Alternatively, the data transmitter/receiver system 40 may consist of an integral system including the computer and interface devices as part of the system.

Description will be hereinafter made with reference to FIGS. 4 to 10 in regard to the general mode of operation of a first preferred embodiment of an IC card according to the present invention.

Figure 4:
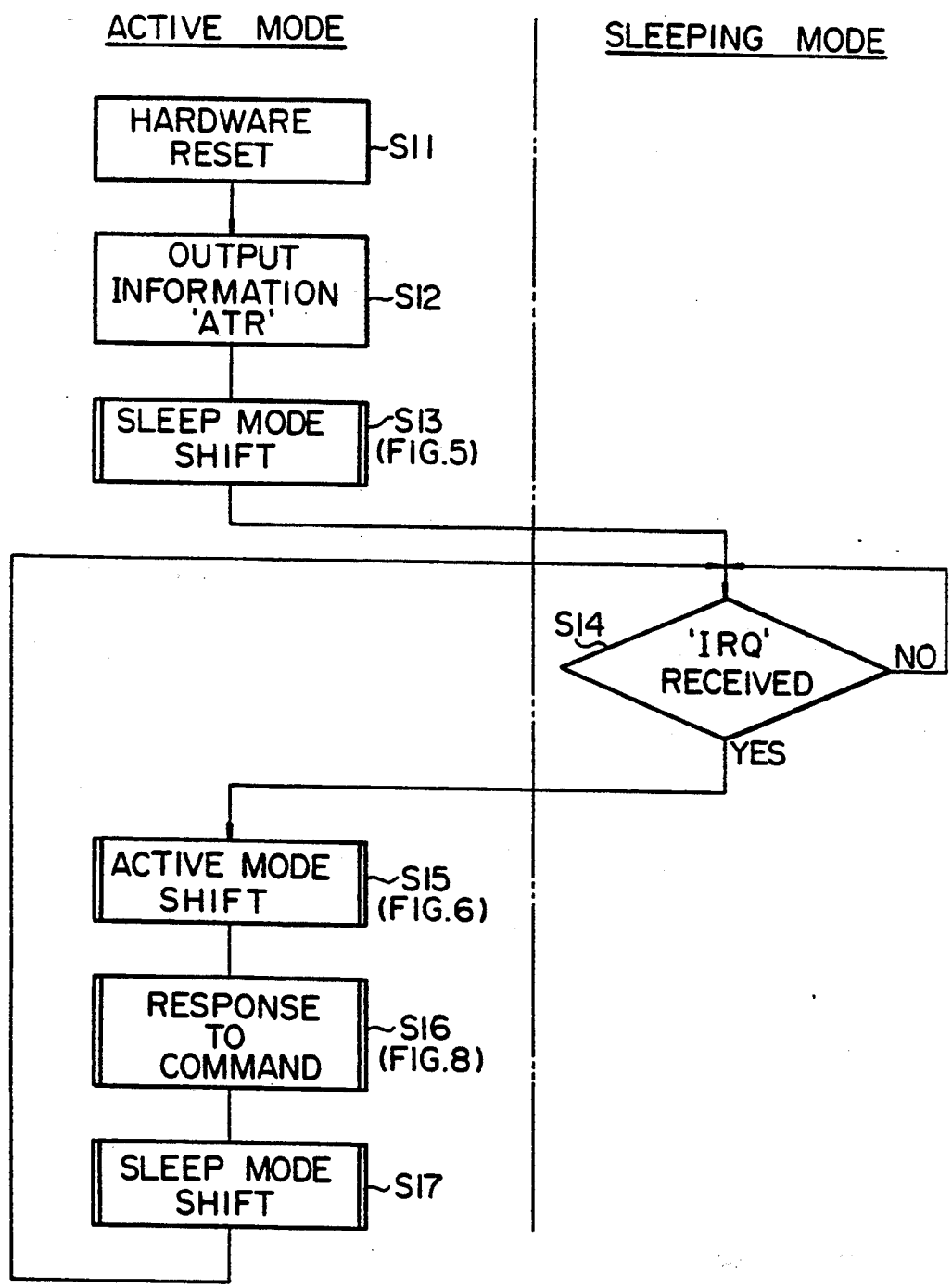
FIG. 4 is a flowchart showing the main routine program predominant over the operation of the microprocessor unit incorporated in a first preferred embodiment of an IC card according to the present invention.

FIG. 4 is a flowchart showing the main routine program predominant over the basic mode of operation which the IC card 20 embodying the present invention performs with the data transmitter/receiver system 40.

The execution of the main routine program is started when the IC card 20 is loaded into the data transmitter/receiver system 40 and the contacts $C_1$ to $C_5$ of the former are electrically coupled to the respectively corresponding ones of the interface device 44 of the latter. Thus, a predetermined supply voltage $V_{cc}$ is supplied from the data transmitter/receiver system 40 to the supply voltage input contact $C_1$ of the IC card 20 and is fed to each of the microprocessor unit 22 and data storage memory 24 of the IC card 20 and, in addition, the ground contact $C_2$ of the IC card 20 is coupled to the corresponding terminal of the data transmitter/receiver system 40 so that a ground potential $V_{ss}$ is established at the ground port of each of the microprocessor unit 22 and data storage memory 24 of the IC card 20. Further supplied from the data transmitter/receiver system 40 are a train of clock pulses CLK which is applied through the clock input contact $C_3$ of the IC card 20 to the corresponding port of the microprocessor unit 22 and a reset signal $\overline{RST}$ which is applied through the reset contact $C_4$ of the IC card 20 to the corresponding port of the microprocessor unit 22.

The microprocessor unit 22 in receipt of the reset signal $\overline{RST}$ executes hardware reset subroutine program S11 to initializes the various active devices incorporated in the microprocessor unit 22. Upon termination of the execution of the hardware reset subroutine program S11, the microprocessor unit 22 of the IC card 20 proceeds to answer-to-reset "ATR" information transmit subroutine program S12 to output an answer-to-reset information "ATR" from its data output port TX. The answer-to-reset information "ATR" is sent through the input/output contact $C_5$ of the IC card 20 to the data transmitter/receiver system 40 to inform the data transmitter/receiver system 40 that the IC card 20 is now ready to receive command and data from the data transmitter/receiver system 40.

After the status information "ATR" is thus transmitted to the data transmitter/receiver system 40, the microprocessor unit 22 in the IC card 20 executes sleeping mode shift subroutine program S13 to establish an inactive or "sleeping" mode of operation in the microprocessor unit 22 of the IC card 20. When the sleeping mode of operation is established in the microprocessor unit 22, the microprocessor unit 22 per se is held inoperative with the contents of the registers retained therein and with some of the peripheral devices such as the timers and serial communication interface device allowed to continue their operations. Details of such a sleeping mode of operation of the microprocessor unit 22 are disclosed in, for example, Hitachi Limited, "Hitachi Microprocessor Data Book (8-Bit Single-Chip)", pages 358/390, February 1985. As discussed in this publication, the power dissipation of a microprocessor in the sleeping mode of operation is reduced to approximately one fifth of the power dissipation in a normal state.

When the sleeping mode of operation is established in the microprocessor unit 22, the microprocessor unit 22 is inactivated and is disabled from processing data and is accordingly enabled to save consumption of power significantly. Thus, the sleeping mode of operation of the IC card 20 provides a low power consumption state in the first preferred embodiment of the present invention and is distinguished from a normal data processing or "active" mode of operation of the microprocessor unit 22. The details of the sleeping mode shift subroutine program S13 are shown in FIG. 5.

In the sleeping mode shift subroutine program S13 shown in FIG. 5, the microprocessor unit 22 of the IC card 20 proceeds to step S131 to unmask or activate the interrupt request signal input port $\overline{IRQ}$ of the microprocessor unit 22. The microprocessor unit 22 is thus made ready to grant an interrupt responsive to an interrupt request signal "$\overline{IRQ}$" of low level "L" which may be supplied from the data transmitter/receiver system 40. It may be herein noted that the interrupt request signal input port $\overline{IRQ}$ of the microprocessor unit 22 is de-activated and accordingly a request for interrupt to the microprocessor unit 22 is rejected during sleeping mode of operation if a data write cycle is enabled in the data storage memory 24 of the IC card 20 as will be described in mode detail. The step S131 is followed step S132 to make a shift from the active mode to the sleeping mode of operation in the IC card, whereupon the microprocessor unit 22 returns to the main routine program illustrated in FIG. 4.

After the sleeping mode of operation is thus established in the IC card 20, the microprocessor unit 22 waits for the interrupt request signal "$\overline{IRQ}$" of low level "L" from the data transmitter/receiver system 40 and, when it is detected at step S14 that such an interrupt request signal "$\overline{IRQ}$" is received at the interrupt request signal input port $\overline{IRQ}$ thereof, the microprocessor unit 22 proceeds to active mode shiftback subroutine program S15 to restore the active or normal data processing mode of operation in the IC card 20 and is enabled to process the data input to or to be output from the microprocessor unit 22. The details of the active mode shiftback subroutine program S15 are shown in FIG. 6.

When the active mode of operation is restored in the IC card 20, the microprocessor unit 22 first proceeds to step S151 shown in FIG. 6 to mask or de-activate the interrupt request signal input port $\overline{IRQ}$ thereof. The interrupt request signal input port $\overline{IRQ}$ of the microprocessor unit 22 being thus de-activated, generation of an interrupt to the microprocessor unit through the port $\overline{IRQ}$ is prohibited. Subsequently, the microprocessor unit 22 of the IC card 20 proceeds to step S152 to update the content of the stack pointer (not shown) to a value indicating the address of the subroutine program which is to be executed when the microprocessor unit 22 returns to the main routine program upon termination of the active mode shiftback subroutine program S15. The step S152 is followed by step S153 at which the microprocessor unit 22 updates the content of the program counter (not shown) and places therein the address assigned to the command input subroutine program (S161) to be described. Having updated the content of the program counter, the microprocessor unit 22 returns to the main routine program illustrated in FIG. 4.

After the active or normal data processing mode of operation is thus restored in the IC card 20 through execution of the subroutine program S15 as hereinbefore described, the microprocessor unit 22 of the IC card 20 proceeds to response-to-command subroutine program S16 on receipt of a serial command/data signal C/D supplied from the data transmitter/receiver system 40 through the data input/output contact $C_5$ of the IC card 20. The serial command/data signal C/D thus supplied from the data transmitter/receiver system 40 is assumed to have a data length consisting of a single byte or a plurality of bytes. The details of the response-to-command subroutine program S16 will be hereinafter described with reference to FIG. 8.

Having processed the command/data signal C/D through execution of the response-to-command subroutine program S16, the microprocessor unit 22 in the IC card 20 proceeds to another sleeping mode shift subroutine program S17 to make a shift from the active mode to the sleeping mode of operation in the IC card 20 and is disabled from processing data for a second time. From the subroutine program S17, the microprocessor unit 22 of the IC card reverts to step S14 and, when it is detected at this step S14 that another interrupt request signal "$\overline{IRQ}$" of low level "L" is received from the data transmitter/receiver system 40, the microprocessor unit 22 executes the subroutine programs S15, S16 and S17 as hereinbefore described. After the sleeping mode shift subroutine program S17 is thus executed for a second time, the microprocessor unit 22 of the IC card 20 will repeat a loop consisting of the step S14 and subroutine programs S15, S16 and S17 each time it is detected at step S14 that the interrupt request signal "$\overline{IRQ}$" of low level "L" is received from the data transmitter/receiver system 40.

The active and sleeping modes of operation are in this fashion established alternately in the IC card 20 in response to the command/data signal C/D which may be successively supplied from the data transmitter/receiver system 40 to the IC card 20.

Figure 7:
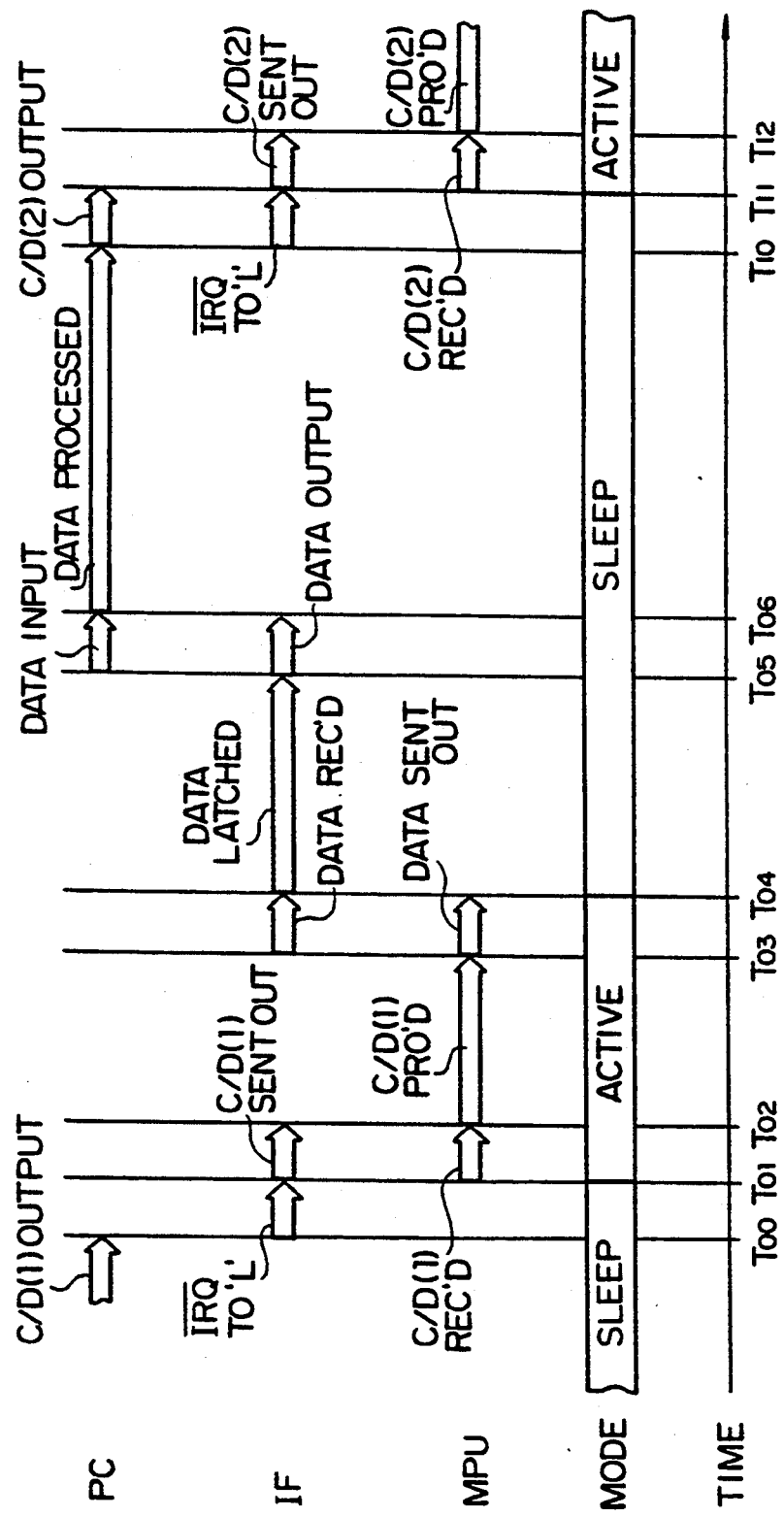
FIG. 7 is a timechart showing the various events which may occur during a cycle of communication carried out between the first preferred embodiment of an IC card according to the present invention and the data transmitter/receiver system to which the IC card is coupled.

FIG. 7 is a timechart showing the various events which may occur during a cycle of communication carried out between the microprocessor unit 22 of the IC card 20 embodying the present invention and the computer 42 and interface device 44 of the data transmitter/receiver system 40.

Referring to the timechart of FIG. 7, a first command/data signal C/D(1) may be output from the computer 42 in the data transmitter/receiver system 40 at time $T_{00}$. After the first command/data signal C/D(1) is output from the computer 42, the potential at the input/output (I/O) terminal of the interface device 44 of the data transmitter/receiver system 40 is swung to low level "L" at time $T_{01}$. In response to the potential of low level "L" thus applied to the interrupt request signal input port $\overline{IRQ}$ of the microprocessor unit 22, a first shift is made from the sleeping mode to the active mode of operation in the IC card 20 at time $T_{01}$ through execution of the active mode shiftback subroutine program S15 (FIG. 6). The first command/data signal C/D(1) output from the computer 42 in the data transmitter/receiver system 40 at time $T_{00}$ is then supplied from the interface device 44 of the data transmitter/receiver system 40 to the data input/output contact $C_5$ of the IC card 20 and is received by the microprocessor unit 22 of the IC card 20 through the data input port RX of the microprocessor unit 22 as at time $T_{02}$. The microprocessor unit 22 then processes the command/data signal C/D(1) thus received to check the command for any error and, when the command processing is complete at time $T_{03}$, the microprocessor unit 22 starts to transmit to the data transmitter/receiver system 40 the data resulting from the command processing through the data output port TX of the microprocessor unit 22 and the data input/output contact $C_5$ of the IC card 20.

The data thus transmitted from the microprocessor unit 22 of the IC card 20 is received by the interface device 44 of the data transmitter/receiver system 40 at time $T_{04}$ and is latched for some time in the interface device 44, whereupon the interface device 44 starts to transfer the data to the computer 42 of the data transmitter/receiver system 40 as at time $T_{05}$. The computer 42 in receipt of the data relayed from the interface device 44 starts to process the input data as at time $T_{06}$.

On completion of the processing of the input data as at time $T_{10}$, a first cycle of communication between the IC card 20 and data transmitter/receiver system 40 is terminated and, accordingly, the computer 42 of the data transmitter/receiver system 40 may output a second command/data signal C/D(2) to start a second cycle of communication with the IC card 20. At an incipient stage of the second cycle of communication between the IC card 20 and data transmitter/receiver system 40, events similar to those which occurred at time $T_{01}$ and time $T_{02}$ will occur in connection with the second command/data signal C/D(2) at time $T_{11}$ and time $T_{12}$, respectively. Thereupon, the microprocessor unit 22 of the IC card 20 processes the second command/data signal C/D(2) and transmits to the data transmitter/receiver system 40 the data resulting from the command processing and, thus, the computer 42 of the data transmitter/receiver system 40 process the received data as in the first cycle of communication between the IC card 20 and data transmitter/receiver system 40.

After the microprocessor unit 22 of the IC card 20 sent out the data to the data transmitter/receiver system 40 at time $T_{04}$ during the first cycle of communication between the IC card 20 and data transmitter/receiver system 40, a first shift is made from the active mode to the sleeping mode of operation in the IC card 20 through execution of the sleeping mode shiftback subroutine program S13 (FIG. 5). The sleeping mode of operation being thus established in the IC card 20, the microprocessor unit 22 of the IC card 20 is disabled from processing data so that the consumption of power in the IC card 20 is saved significantly. The interrupt request signal input port $\overline{IRQ}$ of the microprocessor unit 22 is now unmasked or activated so that the microprocessor unit 22 is ready to grant an interrupt responsive to an interrupt request signal "$\overline{IRQ}$" of low level "L" which may be supplied from the data transmitter/receiver system 40. The microprocessor unit 22 of the IC card maintains the sleeping mode of operation while the data sent out from the microprocessor unit 22 during the first cycle of communication is being processed by means of the computer 42 and interface device 44 of the data transmitter/receiver system 40. Toward the end of the first cycle of communication, the potential at the input/output (I/O) terminal of the interface device 44 of the data transmitter/receiver system 40 is swung to low level "L" at time $T_{10}$. A second shift is made from the sleeping mode to the active mode of operation in the IC card 20 at time $T_{11}$ with the result that the microprocessor unit 22 of the IC card 20 is for a second time enabled to process another command/data signal which may be transmitted from the data transmitter/receiver system 40.

Figure 8:
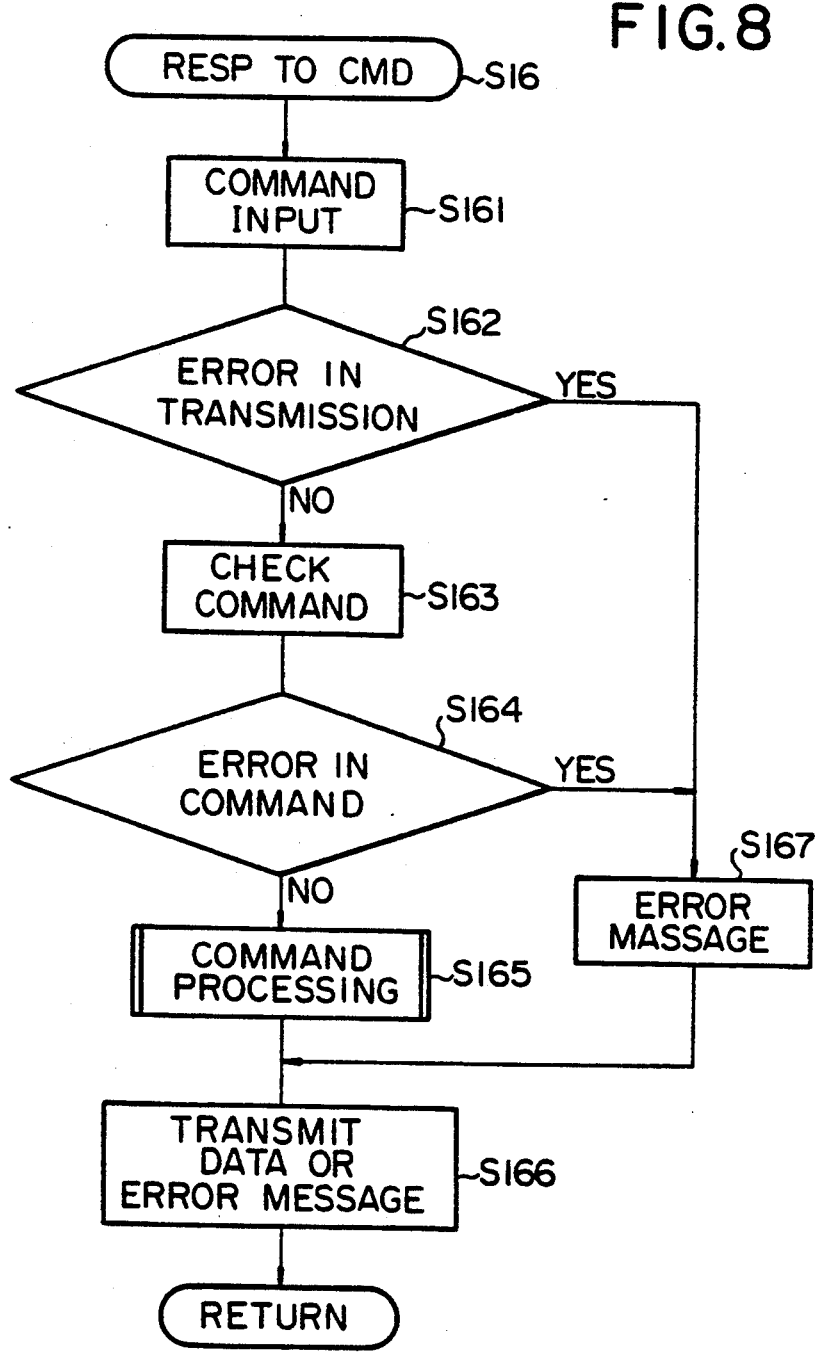
FIG. 8 is a flowchart showing the details of the response-to-command subroutine program further included in the main routine program illustrated in FIG. 4.

FIG. 8 is a flowchart showing the details of the response-to-command subroutine program S16 included in the main routine program hereinbefore described with reference to in FIG. 4.

The response-to-command subroutine program S16 is executed on receipt of a serial command/data signal C/D supplied from the data transmitter/receiver system 40 after the active or normal data processing mode of operation is restored in the IC card 20 through execution of the subroutine program S15 as hereinbefore described with reference to FIG. 4. Responsive to the command/data signal C/D received at step S161, the microprocessor unit 22 of the IC card 20 checks at step S162 if any error has occurred during transmission of the signal C/D received. If it is determined at this step S162 that there has been no error caused during transmission of the signal C/D received, the microprocessor unit 22 proceeds to step S163 to check the signal C/D and at subsequent step S164 detects if any error is involved in the command/data signal C/D received. If it is found at this step S164 that the signal C/D received is free from error, the microprocessor unit 22 proceeds to command processing subroutine program S165 to execute a series of command processing jobs responsive to the command/data signal C/D received and at subsequent step S166 transmits to the data transmitter/receiver system 40 the data resulting from the command processing jobs. Having transmitted the data to the data transmitter/receiver system 40, the microprocessor unit 22 of the IC card 20 reverts to the main routine program illustrated in FIG. 4 and may proceed to the sleeping mode shift subroutine program S17 as previously described.

If it is detected at step S162 that any error has occurred during transmission of the command/data signal C/D from the data transmitter/receiver system 40 to the IC card 22 or at step S164 that there is an error present in the signal C/D received, the microprocessor unit 22 then proceeds to step S167 to output an error message indicative of the presence of an error in the signal C/D received. Subsequently to step S167, the microprocessor unit 22 proceeds to the step S166 to transmit the error message to the data transmitter/receiver system 40 to request the data transmitter/receiver system 40 to output a correct command/data signal. After transmission of the error signal to the data transmitter/receiver system 40, the microprocessor unit 22 of the IC card 20 also reverts to the main routine program illustrated in FIG. 4 and may proceed to the sleeping mode shift subroutine program S17.

Figure 9:
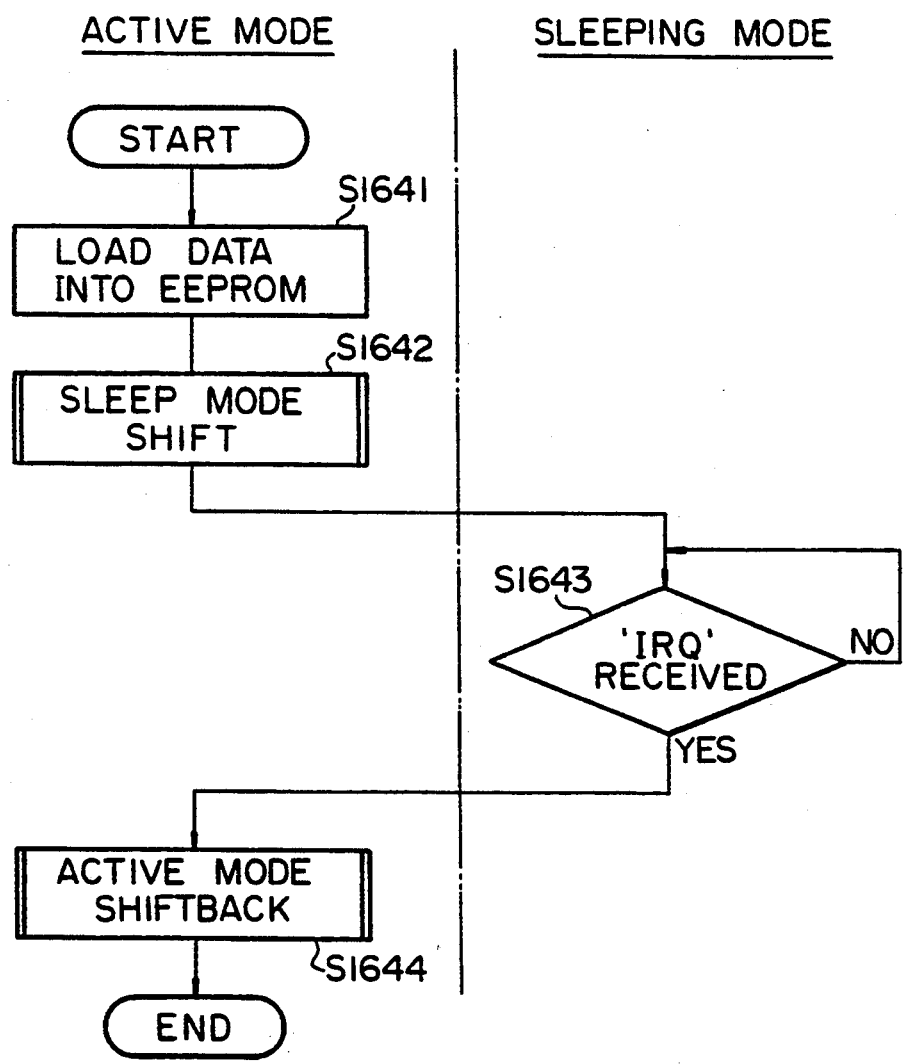
FIG. 9 is a flowchart showing the details of the data storage subroutine program included in the response-to-command subroutine program illustrated in FIG. 8.

The command processing jobs to be performed at the subroutine program S165 may include those for storing into the data storage memory 24 of the IC card 20 the data generated responsive to the command/data signal C/D received from the data transmitter/receiver system 40. FIG. 9 shows the details of the data storage subroutine program to perform such jobs and FIG. 10 shows the waveforms of the signals which may appear in the microprocessor unit 22 of the IC card 20 during data write cycle of the data storage memory 24.

Figure 10:
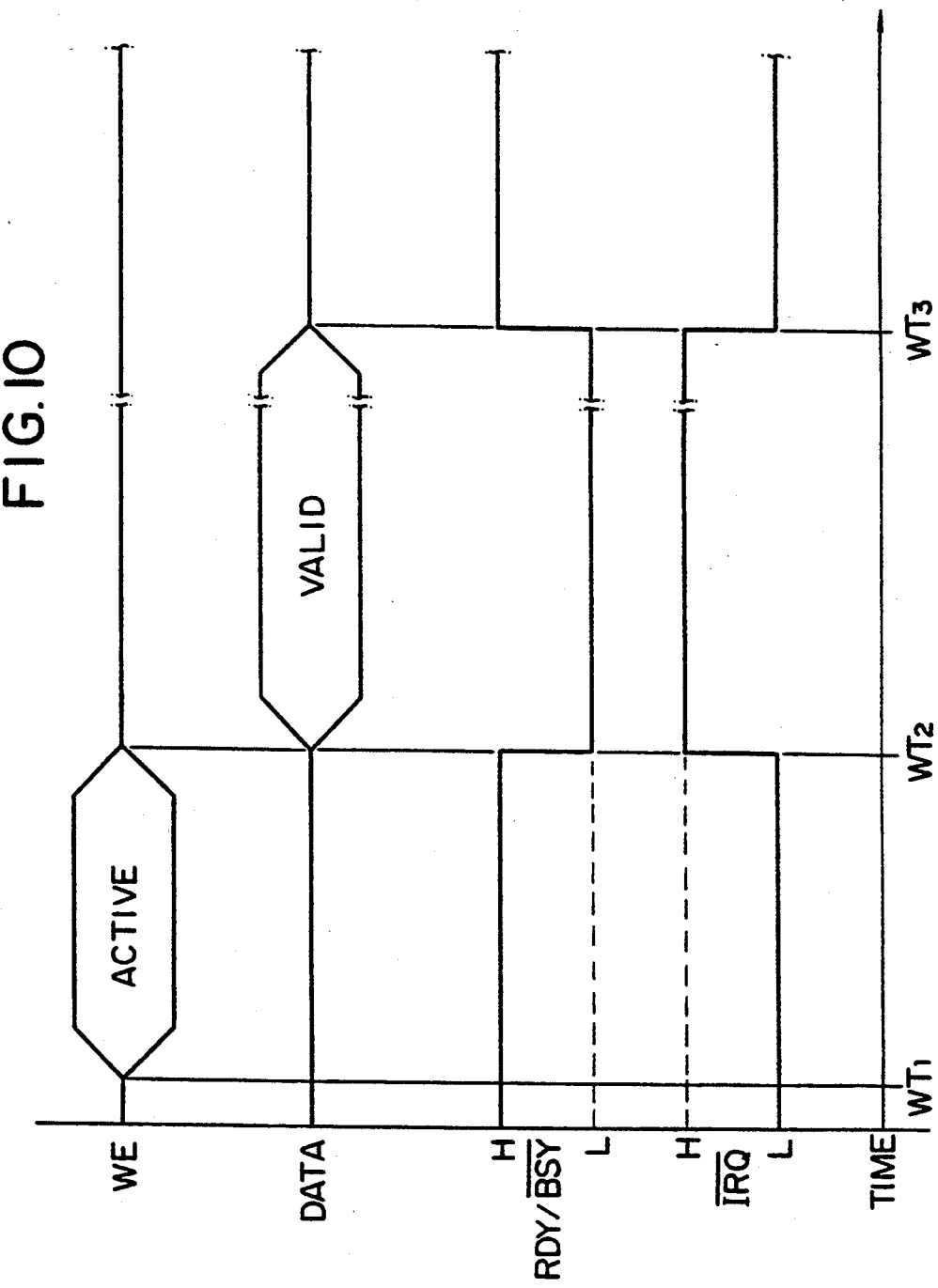
FIG. 10 is a timechart showing the waveforms of the signals which may appear in the microprocessor unit of the IC card embodying the present invention during data write cycle of the data storage memory incorporated in the IC card.

When data is generated in response to the command/data signal C/D received from the data transmitter/receiver system 40, the microprocessor unit 22 of the IC card 20 proceeds to step S1641 to transmit to the data storage memory 24 a write enable signal WE through the control line 30 as at time $WT_1$ in FIG. 10 and the data and address information through the address and data buses 26 and 28, respectively. After the loading of the data into the data storage memory 24 is complete at time $WT_2$, the microprocessor unit 22 executes sleeping mode shift subroutine program S1642 to establish a sleeping mode of operation in the IC card 20. The data loaded into the data storage memory 24 at step S1641 is stored into the memory 24 after the sleeping mode of operation is established in the IC card 20 through execution of the subroutine program S1642 as will be seen from FIG. 10.

After the sleeping mode of operation is established in the IC card 20 at time $WT_2$, the microprocessor unit 22 awaits the interrupt request signal "$\overline{IRQ}$" of low level "L" from the data storage memory 24. When it is detected at decision step S1643 that such an interrupt request signal "$\overline{IRQ}$" is received at the interrupt request signal input port $\overline{IRQ}$ thereof, the microprocessor unit 22 proceeds to active mode shiftback subroutine program S1644 to restore the active or normal data processing mode of operation in the IC card 20 as at time $WT_3$ and is enabled to process the data input to or to be output from the microprocessor unit 22. The sleeping mode shift subroutine program S1642, decision step S1643 and active mode shiftback subroutine program S1644 are identical with the subroutine program S13, step S14 and subroutine program S15, respectively, included in the main routine program described with reference to FIG. 4.

Throughout the data write cycle (from time $WT_2$ to time $WT_3$) of the data storage memory 24, there is an interrupt request signal of low level "L" output from the interrupt request signal output port $RDY/\overline{BSY}$ of the data storage memory 24. The interrupt request signal of low level "L" is inverted by the inverter 32 so that a potential of high level "H" appears at the interrupt signal input port $\overline{IRQ}$ of the microprocessor unit 22. The microprocessor unit 22 is thus prohibited from generating an interrupt through the interrupt signal input port $\overline{IRQ}$ thereof when data is being loaded into the memory 24. When the storage of the data into the data storage memory 24 is complete the interrupt request signal at the interrupt request signal output port $RDY/\overline{BSY}$ of the data storage memory 24 is swung to high level "H" at time $WT_3$ as shown in FIG. 10. This interrupt request signal of high level "H" is inverted by the inverter 32 so that a potential of low level "L" appears at the interrupt signal input port $\overline{IRQ}$ of the microprocessor unit 22. The microprocessor unit 22 is thus enabled to grant an interrupt through the interrupt signal input port $\overline{IRQ}$ when it is detected at step S1643 that an interrupt request signal "$\overline{IRQ}$" of low level "L" is received from the data storage memory 24.

Figure 11A:
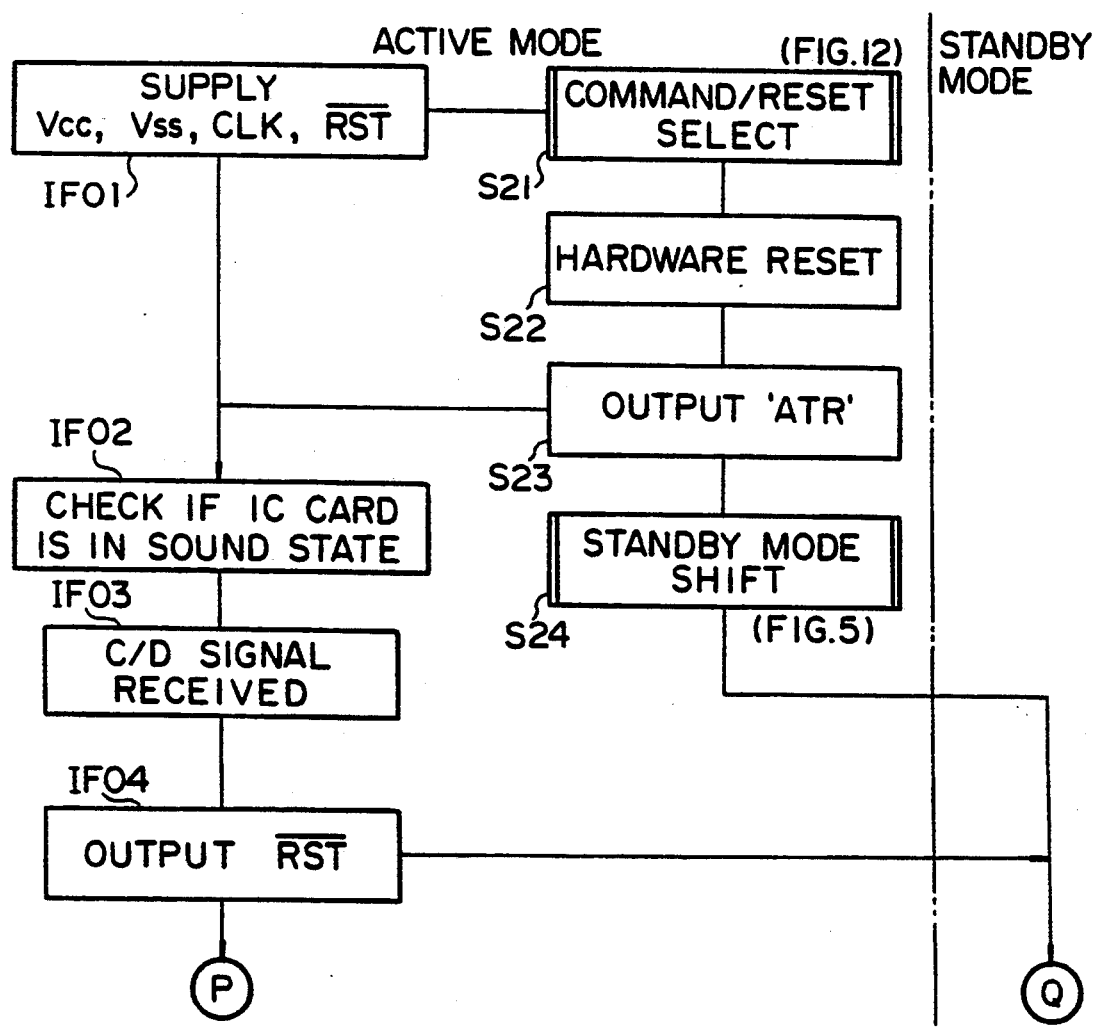

FIGS. 11A and 11B are flowcharts showing the main routine program predominant over the basic mode of operation which a second preferred embodiment of an IC card according to the present invention performs with a data transmitter/receiver system. The second preferred embodiment of an IC card according to the present invention is also assumed to be constructed basically as hereinbefore described with reference to FIG. 3 and to cooperate with the data transmitter/receiver system 40 shown in FIG. 3.

The execution of the main routine program is also started when the IC card 20 is leaded into the data transmitter/receiver system 40 and the contacts $C_1$ to $C_5$ of the former are electrically coupled to the respectively corresponding ones of the interface device 44 of the latter. Referring to FIG. 11A, the computer 42 of the data transmitter/receiver system 40 then proceeds to step IF01 to supply a predetermined supply voltage $V_{cc}$ to the IC card 20 through the supply voltage input contact $C_1$ of the IC card 20 and a ground potential $V_{ss}$ through the ground contact $C_2$ of the IC card 20. At step IF01, the computer 42 of the data transmitter/receiver system 40 further supplies to the IC card 20 a train of clock pulses CLK through the clock input contact C₃ of the IC card 20 and a reset signal $\overline{RST}$ through the reset contact C₄ of the IC card 20.

Figure 12:
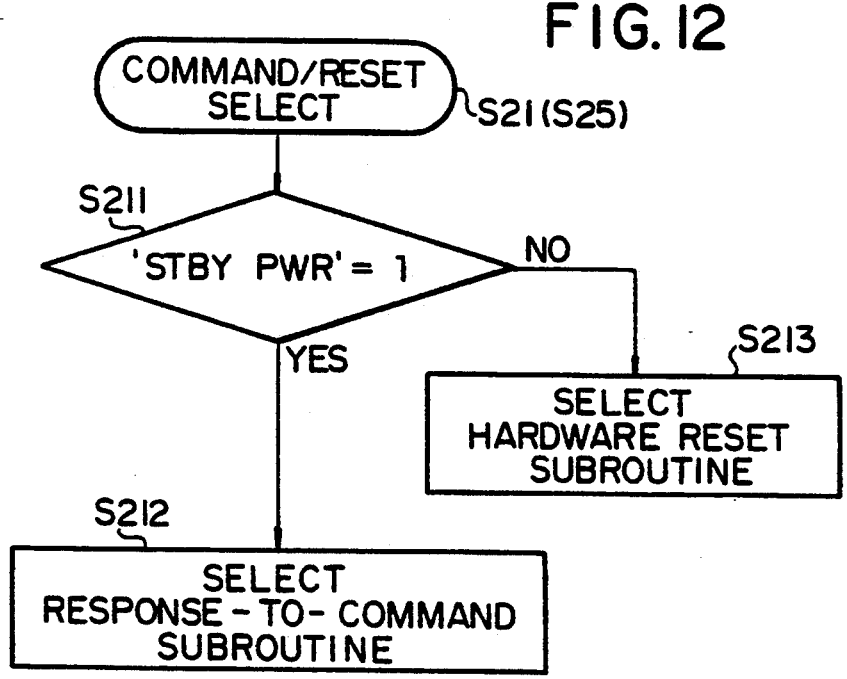
FIG. 12 is a flowchart showing the details of the command processing/hardware reset select subroutine program included in the main routine program illustrated in FIGS. 11A and 11B.

In response to the reset signal $\overline{RST}$ thus supplied through the reset contact C₄ of the IC card 20, the microprocessor unit 22 of the IC card 20 executes a command processing/hardware reset select subroutine program S21. In this command processing/hardware reset select subroutine program S21, the microprocessor unit 22 first proceeds to step S211 shown in FIG. 12 to check if a bit "STBY PWR" is of a logic "1" value. The bit "STBY PWR" of logic "1" value indicates that the supply voltage $V_{cc}$ had been received by the IC card 20 before the reset signal $\overline{RST}$ was input to the microprocessor unit 22 of the IC card 20. If the bit "STBY PWR" is found at step S211 to be of logic "1" value and accordingly the answer for the step S211 is given in the affirmative "YES", the microprocessor unit 22 proceeds to step S212 to make a decision to jump over to a response-to-command subroutine program. On the other hand, if the bit "STBY PWR" is found to be of logic "0" value and accordingly the answer for the step S211 is given in the negative "NO", then the microprocessor unit 22 proceeds to step S213 to make a decision to execute a hardware reset subroutine program S22 to initializes the various active devices incorporated in the microprocessor unit 22.

At an incipient stage after the IC card 20 has been loaded into the data transmitter/receiver system 40, the supply voltage $V_{cc}$ could not be received by the IC card 20 before the reset signal $\overline{RST}$ is input to the microprocessor unit 22 of the IC card 20. It is therefore determined at step S211 that the bit "STBY PWR" is of logic "0" value and accordingly the answer for the step S211 is given in the affirmative "NO" immediately after the IC card 20 is loaded into the data transmitter/receiver system 40. Thus, the command processing/hardware reset select subroutine program S21 is followed by the hardware reset subroutine program S22 to initialize the various active devices incorporated in the microprocessor unit 22. Upon termination of the hardware reset subroutine program S22, the microprocessor unit 22 of the IC card 20 proceeds to answer-to-reset "ATR" information transmit subroutine program S23 to output an answer-to-reset information "ATR" from its data output port TX. The answer-to-reset information "ATR" is sent through the input/output contact C₅ of the IC card 20 to the data transmitter/receiver system 40 to inform the data transmitter/receiver system 40 that the IC card 20 is now ready to receive command and data from the data transmitter/receiver system 40.

After the information "ATR" is thus transmitted to the data transmitter/receiver system 40, the microprocessor unit 22 in the IC card 20 executes standby mode shift subroutine program S24 to establish an inactive or "standby" mode of operation in the microprocessor unit 22 of the IC card 20. When the standby mode of operation is established in the microprocessor unit 22, the microprocessor unit 22 stops all the clocks and shifts to the reset state. Details of this standby mode of operation of the microprocessor unit 22 are also disclosed in "Hitachi Microprocessor Data Book (8-Bit Single-Chip)", ibid. As discussed in this publication, the power dissipation of a microprocessor in the standby mode of operation is reduced to the order of several microamperes.

The standby mode of operation is thus essentially similar to the sleeping mode of operation in the first preferred embodiment of the present invention and, when the standby mode of operation is established in the microprocessor unit 22, the microprocessor unit 22 is de-activated and is disabled from processing data and is accordingly enabled to save consumption of power significantly. Thus, the standby mode of operation of the second preferred embodiment of the present invention also provides a low power consumption state and is distinguished from a normal data processing or active mode of operation of the microprocessor unit 22. The standby mode shift subroutine program S24 is similar to the subroutine program S13 hereinbefore described with reference to FIG. 5. In the standby mode shift subroutine program S24, the microprocessor unit 22 of the IC card 20 thus unmasks or activates the interrupt request signal input port $\overline{IRQ}$ of the microprocessor unit 22 and is made ready to grant an interrupt responsive to an interrupt request signal "$\overline{IRQ}$" of low level "L" which may be supplied from the data transmitter/receiver system 40. As in the sleeping mode of operation of the first preferred embodiment of the present invention, the interrupt request signal input port $\overline{IRQ}$ of the microprocessor unit 22 is de-activated and accordingly a request for interrupt to the microprocessor unit 22 is rejected during standby mode of operation if a data write cycle is enabled in the data storage memory 24 of the IC card 20. After the microprocessor unit 22 of the IC card 20 is thus made ready to grant an interrupt, a shift is made from the active mode to the standby mode of operation in the IC card, whereupon the microprocessor unit 22 returns to the main routine program illustrated in FIG. 11A.

After the standby mode of operation is thus established in the IC card 20, the microprocessor unit 22 waits for the interrupt request signal "$\overline{IRQ}$" of low level "L" from the data transmitter/receiver system 40 and, when it is detected that such an interrupt request signal "$\overline{IRQ}$" is received at the interrupt request signal input port $\overline{IRQ}$ thereof, the microprocessor unit 22 proceeds to an active mode shiftback subroutine program similar to the subroutine program S15 described with reference to FIG. 6 and, thus, restores the active or normal data processing mode of operation in the IC card 20 to process the data input to or to be output from the microprocessor unit 22. The active mode of operation being restored in the IC card 20, the microprocessor unit 22 masks or de-activates the interrupt request signal input port $\overline{IRQ}$ thereof to prohibit generation of an interrupt to the microprocessor unit through the port $\overline{IRQ}$. Subsequently, the microprocessor unit 22 updates the content of the stack pointer (not shown) to a value indicating the address of the subroutine program which is to be executed when the microprocessor unit 22 returns to the main routine program upon termination of the active mode shiftback subroutine program. Furthermore, the microprocessor unit 22 updates the content of the program counter (not shown) and places therein the address assigned to the command input subroutine program to be described.

Figure 13:
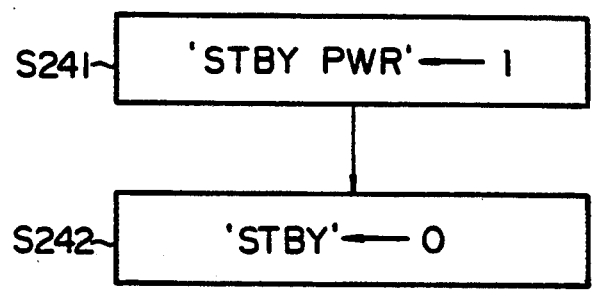
FIG. 13 is a flowchart showing steps additionally included in the standby mode shift subroutine program also included in the main routine program illustrated in FIGS. 11A and 11B.

During the standby mode of operation, the microprocessor unit 22 of the IC card 20 sets the bit "STBY PWR" to logic "1" value at step S241 and raises a flag "STBY" of logic "0" value at step S242 as shown in FIG. 13. These steps S241 and S242 are required for the microprocessor unit 22 to proceed from the step S211 to step S212 when the command processing/hardware reset select subroutine program S21 (FIG. 12) is executed after the active mode of operation is restored. The bit "STBY PWR" and flag "STBY" are supplied from the computer 42 of the data transmitter/receiver system 40 or are generated under the control of the computer 42 of the data transmitter/receiver system 40 and, thus, a shift from the active mode to the standby mode of operation in the IC card 20 is made under the direct or indirect control of the data transmitter/receiver system 40.

The answer-to-reset information "ATR" output from the data output port TX of the microprocessor unit 22 is transmitted from the contact $C_5$ of the IC card 20 to the data input/output of the interface device 44 of the data transmitter/receiver system 40. The interface device 44 of the data transmitter/receiver system 40 in receipt of the answer-to-reset information "ATR" checks at step IF02 if the IC card 20 is in a sound state and at step IF03 if there is present a command/data signal C/D received from the computer 42. In the presence detected of the command/data signal C/D received from the IC computer 42, the interface device 44 of the data transmitter/receiver system 40 outputs at step IF04 a reset signal $\overline{RST}$ which is transmitted to the microprocessor unit 22 of the IC card 20 through the reset contact $C_4$ of the IC card 20. Responsive to the reset signal $\overline{RST}$ thus supplied through the reset contact $C_4$ of the IC card 20, the microprocessor unit 22 of the IC card 20 makes a shift from the standby mode to the active mode of operation. In the active mode of operation thus restored, the microprocessor unit 22 executes a command processing/hardware reset select subroutine program S25 shown in FIG. 11B. The command processing/hardware reset select subroutine program S25 is similar to the subroutine program S21 described with reference to FIG. 12.

The bit "STBY PWR" having been set to logic "1" value at step S241 (FIG. 13), it is determined in the processing/hardware reset select subroutine program S25 that the bit "STBY PWR" is of logic "1" value. Thus, the command processing/hardware select subroutine program S25 is followed by a response-to-command subroutine program S26. The response-to-command subroutine program S26 is similar to the subroutine program S16 hereinbefore described with reference to FIG. 8 and is, thus, executed on receipt of a serial command/data signal C/D supplied from the data transmitter/receiver system 40 at step IF05 after the active or normal data processing mode of operation is restored in the IC card 20. In the response-to-command subroutine program S26, the microprocessor unit 22 responsive to the command/data signal C/D received from the data transmitter/receiver system 40 checks if any error has occurred during transmission of the signal C/D received. If it is determined that there has been no error caused during transmission of the signal C/D received, the microprocessor unit 22 detects if any error is involved in the command/data signal C/D received. If it is found that the signal C/D received is free from error, the microprocessor unit 22 executes a series of command processing jobs responsive to the command/data signal C/D received and thereafter proceeds to step S27 to transmit to the data transmitter/receiver system 40 the data resulting from the command processing jobs. Having transmitted the data to the data transmitter/receiver system 40, the microprocessor unit 22 of the IC card 20 proceeds to standby mode shift subroutine program S28 to establish the standby mode of operation for a second time in the microprocessor unit 22 of the IC card 20 and may repeat the series of steps S25, S26, S27 and S28 as hereinbefore described.

On receipt of the data from the IC card 20 at step IF06, the interface device 44 of the data transmitter/receiver system 40 relays the data to the computer 42 at step IF07 and may thereafter repeat the series of step IF03, IF04 and IF05.

Figure 14:
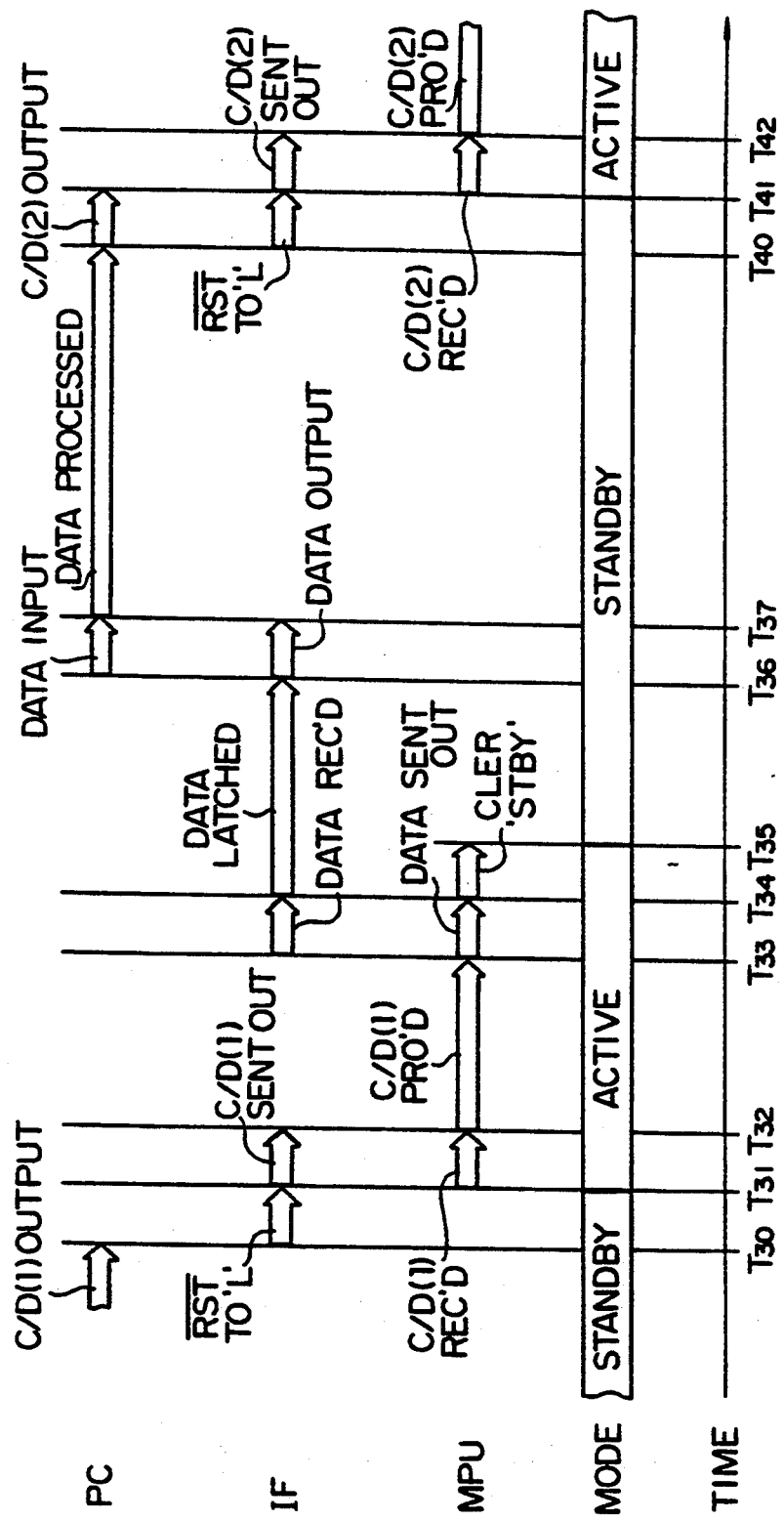
FIG. 14 is a timechart showing the various events which may occur during a cycle of communication carried out between the second preferred embodiment of an IC card according to the present invention and the data transmitter/receiver system to which the IC card is coupled.

FIG. 14 is a timechart showing the various events which may occur during a cycle of communication carried out between the data transmitter/receiver system 40 and the microprocessor unit 22 in the second preferred embodiment of an IC card according to the present invention.

Referring to FIG. 14, a first command/data signal C/D(1) may be output from the computer 42 in the data transmitter/receiver system 40 at time $T_{30}$. After the first command/data signal C/D(1) is output from the computer 42, the potential at the reset terminal of the interface device 44 of the data transmitter/receiver system 40 is swung to low level "L" at time $T_{31}$. In response to the potential of low level "L" thus applied to the reset port $\overline{RST}$ of the microprocessor unit 22, a first shift is made from the standby mode to the active mode of operation in the IC card 20 at time $T_{31}$ through execution of the active mode shift-back subroutine program (FIG. 6). The first command/data signal C/D(1) output from the computer 42 in the data transmitter/receiver system 40 at time $T_{30}$ is then supplied from the interface device 44 of the data transmitter/receiver system 40 to the contact $C_5$ of the IC card 20 and is received by the microprocessor unit 22 of the IC card 20 through the data input port RX of the microprocessor unit 22 as at time $T_{32}$. The microprocessor unit 22 then processes the command/data signal C/D(1) to check the command for any error and, when the command processing is complete at time $T_{33}$, the microprocessor unit 22 starts to transmit the resultant data to the data transmitter/receiver system 40 through the data output port TX of the microprocessor unit 22 and the data input/output contact $C_5$ of the IC card 20.

After the data is transmitted from the microprocessor unit 22 of the IC card 20 and is received by the interface device 44 of the data transmitter/receiver system 40 at time $T_{34}$, the microprocessor unit 22 of the IC card 20 sets the bit "STBY PWR" to logic "1" value (step S241) and resets the flag "STBY" of logic "0" value (step S242) as at time $T_{35}$. The data received by the interface device 44 of the data transmitter/receiver system 40 at time $T_{34}$ is latched for some time in the interface device 44, whereupon the interface device 44 starts to transfer the data to the computer 42 of the data transmitter/receiver system 40 at time $T_{36}$. The computer 42 in receipt of the data from the interface device 44 starts to process the input data as at time $T_{37}$.

On completion of the processing of the input data as at time $T_{40}$, a first cycle of communication between the IC card 20 and data transmitter/receiver system 40 is terminated and, accordingly, the computer 42 of the data transmitter/receiver system 40 may output a second command/data signal C/D(2) to start a second cycle of communication with the IC card 20. At an incipient stage of the second cycle of communication between the IC card 20 and data transmitter/receiver system 40, events similar to those which occurred at time $T_{31}$ and time $T_{32}$ will occur in connection with the second command/data signal C/D(2) at time $T_{41}$ and time $T_{42}$, respectively. Thereupon, the microprocessor unit 22 of the IC card 20 processes the second command/data signal C/D(2) and transmits to the data transmitter/receiver system 40 the data resulting from the command processing and, thus, the computer 42 of the data transmitter/receiver system 40 process the received data as in the first cycle of communication between the IC card 20 and data transmitter/receiver system 40.

After the microprocessor unit 22 of the IC card 20 set the bit "STBY PWR" to logic "1" value and reset the flag "STBY" to logic "0" value at time $T_{35}$ during the first cycle of communication between the IC card 20 and data transmitter/receiver system 40, a first shift is made from the active mode to the standby mode of operation in the IC card 20. The interrupt request signal input port $\overline{IRQ}$ of the microprocessor unit 22 is now unmasked or activated so that the microprocessor unit 22 is ready to grant an interrupt responsive to an interrupt request signal "$\overline{IRQ}$" of low level "L" which may be supplied from the data transmitter/receiver system 40. The microprocessor unit 22 of the IC card maintains the standby mode of operation while the data sent out from the microprocessor unit 22 during the first cycle of communication is being processed by means of the computer 42 and interface device 44 of the data transmitter/receiver system 40. Toward the end of the first cycle of communication, the potential at the reset terminal of the interface device 44 of the data transmitter/receiver system 40 is swung to low level "L" at time $T_{40}$. A second shift is made from the standby mode to the active mode of operation in the IC card 20 at time $T_{41}$ with the result that the microprocessor unit 22 of the IC card 20 is for a second time enabled to process another command/data signal which may be transmitted from the data transmitter/receiver system 40.

The command processing jobs to be performed in the response-to-command subroutine program S26 as hereinbefore described with reference to FIG. 11B may include those for storing into the data storage memory 24 of the IC card 20 the data generated responsive to the command/data signal C/D received from the data transmitter/receiver system 40. The data storage subroutine program to perform such jobs is similar to the subroutine program hereinbefore described with reference to FIG. 9 and, thus, waveforms similar to those shown in FIG. 10 may appear in the microprocessor unit 22 of the IC card 20 during data write cycle of the data storage memory 24.

While a sleeping or standby mode of operation is used to establish a low power consumption state in the hereinbefore described preferred embodiments of an IC card according to the present invention, a "NOP" or no-operation mode or any other inactive mode of operation may be used to establish such a state depending on the type and design of the semiconductor device used as the microprocessor unit in the IC card.

In the second preferred embodiment of an IC card according to the present invention, a shift is made from the active mode to the standby mode of operation responsive to the bit "STBY PWR" of logic "1" value and the flag "STBY" of logic "0" value. These bit "STBY PWR" and flag "STBY" may be generated in from the computer 42 of the data transmitter/receiver system 40 and supplied to the IC card 20 or may be generated in the IC card 20 per se under the control of any control signal generated in and supplied from the computer 42 of the data transmitter/receiver system 40.

It has been assumed that the present invention is embodied in an IC card for use with a data transmitter/receiver system of the type incorporating a built-in power supply source but it will be apparent that the present invention may be applied to an IC card for use with a data transmitter/receiver system to be powered from an external source or to an IC card of the type having a power supply incorporated in the IC card per se.

What is claimed is:

1. A portable semiconductor integrated-circuit card including a data processing means having an active mode of operation capable of processing data and a low power consumption mode of operation wherein said data processing means is disabled from processing said data and enabled for discriminating a first control signal, said data processing means being integrated on a single semiconductor chip, said data processing means comprising:
   a) first mode shift means responsive to a second control signal generated by a communication device external to said integrated-circuit card for making a shift from said active mode of operation to said low power consumption mode of operation upon completion of executing a predetermined program sequence for entering a ready state to communicate with said communication device,
   b) second mode shift means responsive to said first control signal generated by said communication device for making a shift from said low power consumption mode of operation to said active mode of operation for executing a program sequence in said active mode, said second mode shift means allowing said data processing means to enter said low power consumption mode again after the execution of said program sequence, said first and second mode shift means cooperating to decrease power consumption of said data processing means, electric power being supplied from outside of said integrated-circuit card to a power supply port of said integrated-circuit card in both active and low power consumption modes of operation, and
   c) control signal port means shared between said first and second control signals.

2. A portable semiconductor integrated-circuit card as set forth in claim 1, said data processing means further comprising:
   d) control signal generating means for generating and inputting said second control signal to said first and second mode shift means in response to a signal generated in and supplied from an external source.

3. A portable semiconductor integrated-circuit card as set forth in claim 1, in which each of said first and second control signals is generated in and supplied from an external source, said external source being connected to said data processing means.

4. A portable integrated-circuit card as set forth in claim 1, in which said first mode shift means is enabled when said integrated-circuit card is loaded into said communication device.

5. A portable integrated-circuit card as set forth in claim 1, in which a portable semiconductor integrated-circuit card further comprises:
   d) an electrically erasable and programmable read only memory device physically separated from said data processing means for communication with said data processing means.

6. A portable integrated-circuit card as set forth in claim 1, in which an electrically erasable and programmable read only memory device is further integrated on said single semiconductor chip together with said data processing means.

7. A portable semiconductor integrated-circuit card comprising:
- a data processing means having an active mode of operation capable of processing data and a low power consumption mode of operation wherein said data processing means is disabled from processing said data but enabled for discriminating a first control signal received via an interface of the data processing means, said data processing means being integrated on a single semiconductor chip;
- first mode shift means included within the data processing means and responsive to a second control signal generated by a communication device external to said integrated-circuit card for making a shift from said active mode of operation to said low power consumption mode of operation upon completion of executing a predetermined program sequence;
- second mode shift means included within said data processing means and responsive to said first control signal generated by said communication device for making a shift from said low power consumption mode of operation to said active mode of operation for executing a program sequence, said second mode shift means allowing said data processing means to enter said low power consumption mode after the execution of said program sequence, said first and second mode shift means providing decreased power consumption of said data processing means, electric power being supplied from outside of said integrated-circuit card to a power supply port of said integrated-circuit card in both active and low power consumption modes of operation; and
- control signal port means included within the data processing means for selectively receiving the first control signal and the second control signal.

* * * * *